(12) United States Patent
Ting et al.

(10) Patent No.: US 10,435,225 B2
(45) Date of Patent: Oct. 8, 2019

(54) HEAT SEALABLE FOOD PACKING FILMS, METHODS FOR THE PRODUCTION THEREOF, AND FOOD PACKAGES COMPRISING HEAT SEALABLE FOOD PACKAGING FILMS

(71) Applicant: AdvanSix Inc., Morris Plains, NJ (US)

(72) Inventors: Yuan-Ping Robert Ting, Plainsboro, NJ (US); Simon J. Porter, Chesterfield, VA (US); Ken Guhse, Monroe, NC (US); Jeffrey D. Moulton, Columbia, SC (US)

(73) Assignee: AdvanSix Resins & Chemicals LLC, Parsippany, NJ (US)

( * ) Notice: Subject to any disclaimer, the term of this patent is extended or adjusted under 35 U.S.C. 154(b) by 318 days.

(21) Appl. No.: 15/291,267

(22) Filed: Oct. 12, 2016

(65) Prior Publication Data

US 2017/0029196 A1 Feb. 2, 2017

Related U.S. Application Data

(62) Division of application No. 13/407,230, filed on Feb. 28, 2012, now abandoned.
(Continued)

(51) Int. Cl.
*B65D 65/42* (2006.01)
*B65D 81/26* (2006.01)
(Continued)

(52) U.S. Cl.
CPC ........... *B65D 81/263* (2013.01); *B65D 65/42* (2013.01); *C08J 7/047* (2013.01); *B29C 55/12* (2013.01);
(Continued)

(58) Field of Classification Search
CPC ........ B65D 65/42; B65D 65/38; B65D 81/24; B65D 81/26; B65D 81/263; C08J 7/04;
(Continued)

(56) References Cited

U.S. PATENT DOCUMENTS 3,484,274 A 12/1969 Mccarthy
3,540,921 A 11/1970 Ward et al.
(Continued)

FOREIGN PATENT DOCUMENTS

DE 20211531 U1 9/2002
GB 956874 A 4/1964
(Continued)

OTHER PUBLICATIONS

International Preliminary Report on Patentability issued in PCT/US2012/028055, dated Sep. 26, 2013, 5 pages.
(Continued)

*Primary Examiner* — Lee E Sanderson
(74) *Attorney, Agent, or Firm* — Faegre Baker Daniels LLP

(57) ABSTRACT

Heat sealable food packaging films, methods for the production thereof, and food packages comprising heat sealable food packaging films are provided. The heat sealable food packaging film includes a humidity-dependent permeable film having a moisture vapor transmission rate that increases with an increase in relative humidity (RH). An outer coating comprises a coating material on at least one surface of the humidity-dependent permeable film. The coating material is selected from a nanoclay dispersed in a poly-vinylidene chloride (PVdC) polymer or a stretchable urethane polymer, a stretchable acrylic polymer, or a combination of stretchable urethane polymer and stretchable acrylic polymer. The
(Continued)

coating material may further comprise an anti-blocking agent. The heat sealable food packaging film is biaxially oriented.

20 Claims, 2 Drawing Sheets

Related U.S. Application Data

(60) Provisional application No. 61/451,893, filed on Mar. 11, 2011.

(51) Int. Cl.
C08J 7/04 (2006.01)
B65D 81/24 (2006.01)
B29C 55/12 (2006.01)

(52) U.S. Cl.
CPC .......... B65D 81/24 (2013.01); C08J 2301/02 (2013.01); C08J 2367/00 (2013.01); C08J 2367/04 (2013.01); C08J 2377/00 (2013.01); C08J 2427/08 (2013.01); C08J 2433/00 (2013.01); C08J 2433/08 (2013.01); C08J 2433/10 (2013.01); C08J 2433/12 (2013.01); C08J 2475/04 (2013.01); Y10T 428/249991 (2015.04)

(58) Field of Classification Search
CPC ........ C08J 7/07; C08J 2377/00; C08J 427/08; C08J 2427/08; C08J 7/047; C08J 2377/02; C08J 2377/04; C08J 2377/06; C08J 2377/08; C08J 2377/10; C08J 2377/12; Y10T 428/249991; Y10T 428/249953; B29C 55/12
USPC ................. 428/35.4, 35.7, 36.6, 36.7, 319.3; 427/256, 257, 407.1; 206/524.3
See application file for complete search history.

(56) References Cited

U.S. PATENT DOCUMENTS

| 3,695,923 | A | | 10/1972 | Quartermus et al. |
| 4,120,928 | A | * | 10/1978 | Furukawa ............ B29C 47/0004 264/210.7 |
| 4,826,955 | A | | 5/1989 | Akkapeddi et al. |
| 4,892,765 | A | | 1/1990 | Hisazumi et al. |
| 5,093,154 | A | | 3/1992 | Hatada et al. |
| 5,541,267 | A | | 7/1996 | Akkapeddi et al. |
| 5,552,169 | A | | 9/1996 | Kannankeril et al. |
| 5,677,055 | A | | 10/1997 | Ohkawachi et al. |
| 5,747,560 | A | | 5/1998 | Christiani et al. |
| 5,925,428 | A | | 7/1999 | Hubbard et al. |
| 6,403,231 | B1 | | 6/2002 | Mueller et al. |
| 6,627,324 | B1 | | 9/2003 | Eggers et al. |
| 6,685,871 | B2 | | 2/2004 | Moulton et al. |
| 6,709,759 | B2 | | 3/2004 | Mueller et al. |
| 6,726,968 | B2 | * | 4/2004 | Porter ..................... B32B 27/34 428/34.9 |
| 6,780,522 | B1 | | 8/2004 | Eggers et al. |
| 7,166,656 | B2 | | 1/2007 | Majumdar et al. |
| 7,799,395 | B2 | | 9/2010 | Ebina et al. |
| 7,892,391 | B2 | | 2/2011 | Kendig et al. |
| 2002/0124431 | A1 | | 9/2002 | Duhaut et al. |
| 2003/0175390 | A1 | * | 9/2003 | Oberle ................... B65D 31/02 426/129 |
| 2004/0161599 | A1 | | 8/2004 | Nishizawa et al. |
| 2004/0188310 | A1 | * | 9/2004 | Hamilton ............... B65D 33/01 206/524.8 |
| 2006/0237622 | A1 | | 10/2006 | Vermeulen |
| 2008/0311813 | A1 | | 12/2008 | Ting et al. |
| 2009/0098395 | A1 | * | 4/2009 | Lu ........................... B05D 7/04 428/454 |
| 2009/0266841 | A1 | | 10/2009 | Thomas et al. |
| 2010/0055276 | A1 | | 3/2010 | Chen |
| 2010/0080985 | A1 | | 4/2010 | Noda et al. |
| 2010/0203790 | A1 | * | 8/2010 | Moulton ................... B32B 5/02 442/394 |
| 2010/0255162 | A1 | * | 10/2010 | Becraft .............. B65D 81/2076 426/264 |
| 2012/0003458 | A1 | | 1/2012 | Wu et al. |

FOREIGN PATENT DOCUMENTS

| GB | 1065680 A | 4/1967 |
| GB | 1206188 A | 9/1970 |
| GB | 1415006 A | 11/1975 |
| JP | H01313536 A | 12/1989 |
| JP | H05316933 A | 12/1993 |
| JP | H07251486 A | 10/1995 |
| JP | 10024489 A | 1/1998 |
| JP | 11058490 A | 3/1999 |
| JP | 2001294677 A | 10/2001 |
| JP | 2004351874 A | 12/2004 |
| JP | 2005538225 A | 12/2005 |
| JP | 2007119583 A | 5/2007 |
| JP | 2008535966 A | 9/2008 |
| JP | 2010005947 A | 1/2010 |
| WO | 2006075151 A1 | 7/2006 |
| WO | 2006105273 A1 | 10/2006 |
| WO | 2008157158 A2 | 12/2008 |
| WO | 2010025108 A1 | 3/2010 |
| WO | 2010093572 A2 | 8/2010 |
| WO | 2010114879 A1 | 10/2010 |
| WO | 2012125364 A2 | 9/2012 |

OTHER PUBLICATIONS

International Search Report and Written Opinion issued in PCT/US2012/028055, dated Oct. 19, 2012, 6 pages.
Supplementary European Search Report issued in EP application 1275110.6, dated Aug. 22, 2014, 3 pages.

* cited by examiner

HEAT SEALABLE FOOD PACKING FILMS, METHODS FOR THE PRODUCTION THEREOF, AND FOOD PACKAGES COMPRISING HEAT SEALABLE FOOD PACKAGING FILMS

CROSS-REFERENCE TO RELATED APPLICATION

This application is a divisional of U.S. patent application Ser. No. 13/407,230, filed on Feb. 28, 2012, which claims the benefit under Title 35, U.S.C. § 119(e) of U.S. Provisional Patent Application Ser. No. 61/451,893, filed on Mar. 11, 2011, the disclosures of each are hereby incorporated by reference herein in their entirety.

TECHNICAL FIELD

The present invention generally relates to polymer films, methods for their production, and packages comprising polymer films and, more particularly relates to heat sealable food packaging films, methods for production thereof, and food packages comprising such heat sealable food packaging films.

BACKGROUND

"Moisture sensitive foods" are those foods having transpiration rates that can cause high humidity conditions within a food package, causing moisture condensation, microbial growth, and decay of the product. Exemplary "moisture sensitive foods" include fresh produce and some moist bakery products (e.g., dough). Thus, packaging of moisture sensitive foods should permit the right mix of oxygen, carbon dioxide, and water vapor within the food package. In this regard, packaging material with a "high" moisture vapor transmission rate (MVTR) (that is, greater than 50 g/m$^2$/day at 90% RH and at 23° C.) allows the packaging material to breathe so that moisture vapor inside the package does not turn into condensation. Condensation fogs the food package so a consumer cannot view the package contents and potentially leads to microbial growth and decay, thereby reducing the quality, safety, and shelf life of the food product. As used herein, "moisture vapor transmission rate" or "MVTR" generally is a measure of the egress of water vapor through the packaging material. "Shelf life" is the length of time before a food becomes unsuitable for sale, use, or consumption. The problems caused by high humidity conditions within food packaging are exacerbated at low temperatures. Therefore, packaging in high MVTR packaging material is especially important for packaging moisture sensitive foods stored, transported, and/or marketed at refrigeration temperatures.

Packaging in heat sealable packaging material is also important, for example, to ensure product confinement and protection against outside elements. Unfortunately, packaging material with a high MVTR may not be heat sealable. For example, nylon film has a MVTR value of about 260 g/m$^2$/day for 25 µm thickness at 23° C. and 65% RH, rising to over 400 g/m$^2$/day at 23° C. and 90% RH, but is not heat sealable. Further, most heat sealable polymers are polyethylene- or polyolefin-based, characterized by low moisture vapor transmission rate (MVTR), making them unusable for packaging moisture sensitive foods. For example, poly-vinylidene chloride (PVdC), a halogenated polyolefin, has been used as a heat sealable film or coating, but its high moisture barrier (i.e., a low MVTR) has made it unsuitable for packaging moisture sensitive foods. The MVTR of the heat sealable films or coatings do not change with a change in humidity.

In an attempt to overcome these problems, high MVTR substrates such as nylon film have conventionally been coated with a heat sealable coating such as acrylic, polyurethane, or the like or laminated with a heat sealable film. However, conventional heat sealable coatings and films reduce the MVTR of the substrate. In addition, the off-line coating and lamination processes are costly, as the "off-line" coating and lamination processes first form the substrate into a roll and then require the substrate to be unwound to coat or laminate it. Adhesion of the heat sealable film or coating to the substrate also is difficult to control, often requiring the use of a primer to ensure adhesion.

It is therefore desirable to provide a heat sealable food packaging film that has a high MVTR. It is also desirable to provide a method for producing such a heat sealable food packaging film. It is further desirable to provide a method for producing a heat sealable food packaging film that will be less costly than conventional production methods and eliminate off-line processing and the need for a primer. It is also desired to produce a heat sealable food packaging film that extends food product storage and shelf life. Furthermore, other desirable features and characteristics of the present invention will become apparent from the subsequent detailed description of the invention and the appended claims, taken in conjunction with the accompanying drawings and this background of the invention.

BRIEF SUMMARY

Heat sealable food packaging films are provided. In accordance with one exemplary embodiment, the heat sealable food packaging film comprises a humidity-dependent permeable film. An outer coating comprises a coating material on at least one surface of the humidity-dependent permeable film. The coating material is selected from a nanoclay dispersed in a poly-vinylidene chloride (PVdC) polymer or a stretchable urethane polymer, a stretchable acrylic polymer, or a combination of stretchable urethane polymer and stretchable acrylic polymer. The coating material may further comprise an anti-blocking agent.

Methods are provided for producing heat sealable food packaging film, in accordance with yet another exemplary embodiment of the present invention. The method comprises providing a humidity-dependent permeable film. At least one surface of the humidity-dependent permeable film is coated with a coating material to produce a coated film. The coating material is selected from a nanoclay dispersed in a poly-vinylidene chloride (PVdC) polymer, a stretchable urethane polymer, a stretchable acrylic polymer, or a combination of stretchable urethane polymer and stretchable acrylic polymer. The coated film is biaxially oriented. The coating material is adapted to form an outer coating.

Food packages are provided, in accordance with yet another exemplary embodiment of the present invention. The food package comprises a heat sealable food packaging film comprising a humidity-dependent permeable film. An outer coating comprising a coating material is on at least one surface of the humidity-dependent permeable film. The coating material is selected from a nanoclay dispersed in a poly-vinylidene chloride (PVdC) polymer, a stretchable urethane polymer, a stretchable acrylic polymer, or a combination of stretchable urethane polymer and stretchable acrylic polymer. The heat sealable food packaging film is heat sealed to form the food package.

BRIEF DESCRIPTION OF THE DRAWINGS

Embodiments of the present invention will hereinafter be described in conjunction with the following drawing figures, wherein like numerals denote like elements, and wherein.

DETAILED DESCRIPTION

The following detailed description of various embodiments of the invention is merely exemplary in nature and is not intended to limit the inventive subject matter or the application and uses of the inventive subject matter. Furthermore, there is no intention to be bound by any theory presented in the preceding background or the following detailed description.

Various embodiments are directed to heat sealable food packaging films, methods for the production thereof, and food packages comprising the heat sealable food packaging films. The heat sealable food packaging films have a high moisture vapor transmission rate (hereinafter "MVTR") and the MVTR increases as the relative humidity outside the packaging increases. As used herein, "MVTR" represents the amount of water vapor that diffuses through a film over a period of 24 hours. It is measured per ASTM E96/A/B/Bw methods in g/m$^2$/day at 50% or 90% relative humidity (RH) and at 23° C. or 38° C. As used herein, a "high" MVTR means greater than 50 g/m$^2$/day at 90% RH and at 23° C. The heat sealable food packaging film contemplated herein permits the egress of moisture vapor out of the heat sealed food package, thereby preserving the quality, safety, and shelf life of the packaged moisture sensitive food, and preserves fresh flavor and nutritional value, and reduces supply chain waste. As used herein and noted previously, "moisture sensitive" foods are those food products that have transpiration rates that can cause high humidity conditions within a food package, causing moisture condensation, microbial growth, and decay of the product. Exemplary moisture sensitive foods include fresh fruits and vegetables, and moist bakery products such as fresh dough, breads, cakes, or the like. As used herein, "moist bakery products" have a high moisture content greater than about 12%, supple texture and high water activity between about 0.6 to about 0.85. At high humidity, moist bakery products lose "crust" or "crispness" lessening consumer appeal for the products.

Figure 1:
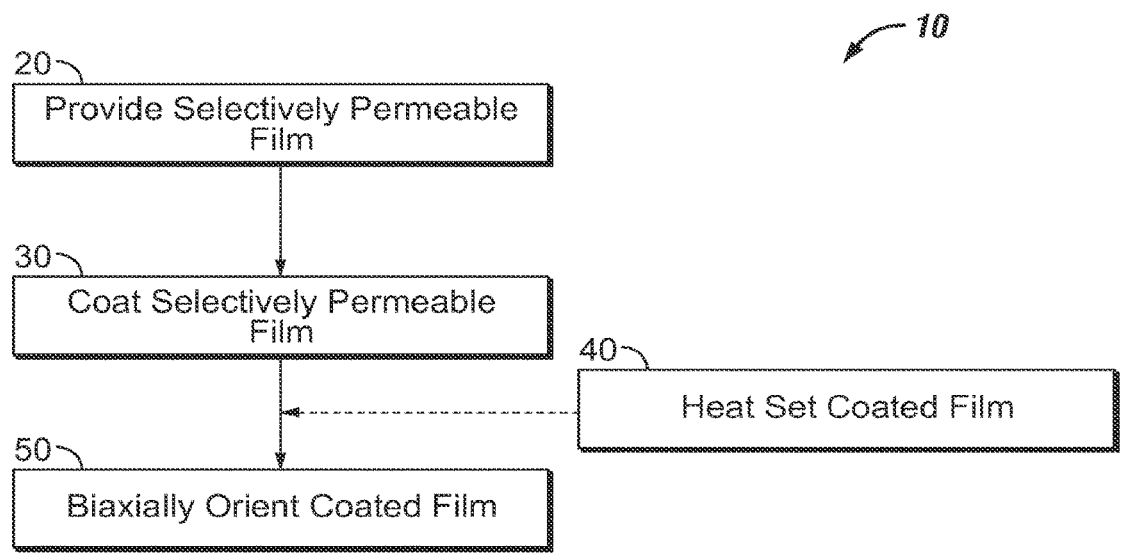
FIG. 1 is a flow diagram of a method for producing heat sealable food packaging films, according to exemplary embodiments of the present invention.
Figure 2:
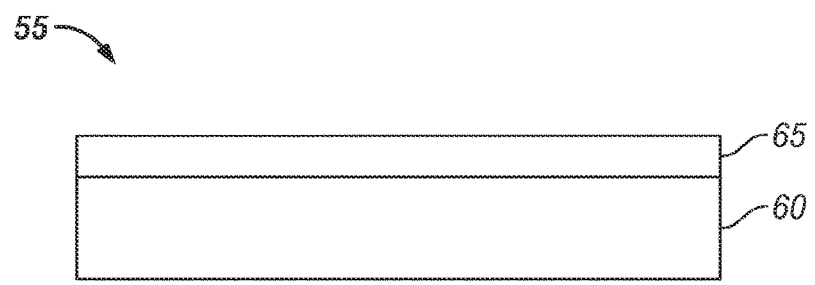
FIG. 2 is a cross-sectional view of a heat sealable food packaging film, according to exemplary embodiments of the present invention.

Referring to FIGS. 1 and 2, a method for forming a heat sealable food packaging film 55 as contemplated herein begins by providing a humidity-dependent permeable film 60 that is otherwise not heat sealable (step 20). As used herein, a "humidity-dependent permeable" film is a non-porous, monolithic film that is permeable to water vapor egress but substantially impermeable to liquid water ingress and has a moisture vapor transmission rate that increases with an increase in relative humidity (RH). The humidity-dependent permeable film has a high MVTR as previously defined. At low relative humidity (i.e., about 0% to about 70% RH), the film shows a lower MVTR than at a higher relative humidity (i.e., greater than 70% to about 95% RH), i.e., when the relative humidity increases and the risk of condensation occurs, the film starts to breathe. Therefore, when condensation inside of the package increases because of the higher relative humidity, the moisture diffuses through the film to the outside of the package.

In one exemplary embodiment, the humidity-dependent permeable film 60 may comprise nylon. As noted previously, nylon film (biaxially oriented), a conventional packaging film, has a MVTR of about 260 g/m$^2$/day for 25 μm thickness at 23° C. and 65% RH, rising to over 400 g/m$^2$/day at 23° C. and 90% RH, but is not heat sealable. Non-limiting examples of nylons useful herein include homopolymers or copolymers selected from aliphatic polyamides and aliphatic/aromatic polyamides having a molecular weight of from about 10,000 to about 100,000 Daltons. General procedures useful for the preparation of polyamides are well known to the art. Such include the reaction products of diacids with diamines. Useful diacids for making polyamides include dicarboxylic acids which are represented by the general formula:

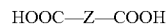

wherein Z is representative of a divalent aliphatic radical containing at least 2 carbon atoms, such as adipic acid, sebacic acid, octadecanedioic acid, pimelic acid, suberic acid, azelaic acid, dodecanedioic acid, and glutaric acid. The dicarboxylic acids can be, for example, aliphatic acids, or aromatic acids such as isophthalic acid and terephthalic acid. Suitable diamines for making polyamides include, for example, those having the formula:

wherein n has an integer value of 1-16, and includes such compounds as trimethylenediamine, tetramethylenediamine, pentamethylenediamine, hexamethylenediamine, octamethylenediamine, decamethylenediamine, dodecamethylenediamine, hexadecamethylenediamine, aromatic diamines such as p-phenylenediamine, 4,4'-diaminodiphenyl ether, 4,4'-diaminodiphenyl sulfone, 4,4'-diaminodiphenylmethane, alkylated diamines such as 2,2-dimethylpentamethylenediamine, 2,2,4-trimethylhexamethylenediamine, and 2,4,4 trimethylpentamethylenediamine, as well as cycloaliphatic diamines, such as diaminodicyclohexylmethane, and other compounds. Other useful diamines include heptamethylenediamine, nonamethylenediamine, and the like.

Useful polyamide homopolymers include poly(4-aminobutyric acid)(nylon 4), poly(6-aminohexanoic acid)(nylon 6, also known as poly(caprolactam)), poly(7-aminoheptanoic acid)(nylon 7), poly(8-aminooctanoic acid)(nylon 8), poly(9-aminononanoic acid)(nylon 9), poly(10-aminodecanoic acid)(nylon 10), poly(11-aminoundecanoic acid)(nylon 11), poly(12-aminododecanoic acid)(nylon 12), nylon 4,6, poly(hexamethylene adipamide)(nylon 6,6), poly(hexamethylene sebacamide)(nylon 6,10), poly(heptamethylene pimelamide)(nylon 7,7), poly(octamethylene suberamide) (nylon 8,8), poly(hexamethylene azelamide) (nylon 6,9), poly(nonamethylene azelamide)(nylon 9,9), poly(decamethylene azelamide)(nylon 10,9), poly(tetramethylenediamine-co-oxalic acid)(nylon 4,2), the polyamide of n-dodecanedioic acid and hexamethylenediamine (nylon 6,12), the polyamide of dodecamethylenediamine and n-dodecanedioic acid (nylon 12,12) and the like. Useful aliphatic polyamide copolymers include caprolactam/hexamethylene adipamide copolymer (nylon 6,6/6), hexamethylene adipamide/caprolactam copolymer (nylon 6/6,6), trimethylene adipamide/hexamethylene azelaiamide copolymer (nylon trimethyl 6,2/6,2), hexamethylene adipamide-hexamethylene-azelaiamide caprolactam copolymer (nylon 6,6/6,9/6) and the like. Also included are other nylons that are not particularly delineated here. In some examples utilizing polyamides, the polyamide can be selected from nylon 6, nylon 6,6, nylon 6/6,6 and mixtures thereof.

Aliphatic polyamides may be obtained from commercial sources or prepared in accordance with known preparatory techniques. For example, poly(caprolactam) can be obtained from Honeywell International Inc., Morristown, N.J. under the trademark CAPRON®. Non-limiting examples of aliphatic and aromatic polyamides include poly(tetramethylenediamine-co-isophthalic acid)(nylon 4,I), polyhexamethylene isophthalamide(nylon 6,I), hexamethylene adipamide/hexamethylene-isophthalamide(nylon 6,6/6I), hexamethylene adipamide/hexamethylene-terephthalamide (nylon 6,6/6T), poly (2,2,2-trimethyl hexamethylene terephthalamide), poly(m-xylylene adipamide) (MXD6), poly(p-xylylene adipamide), poly(hexamethylene terephthalamide), poly(dodecamethylene terephthalamide), polyamide 6T/6I, polyamide 6/MXDT/I, polyamide MXDI, and the like. Blends of two or more aliphatic/aromatic polyamides can also be used. Aliphatic/aromatic polyamides can be prepared by known preparative techniques or can be obtained from commercial sources.

In accordance with another exemplary embodiment, the humidity-dependent permeable film may be a polylactic acid (PLA) film. PLA is a thermoplastic aliphatic polyester derived from renewable resources, such as corn starch (in the United States), tapioca products (roots, chips or starch mostly in Asia) or sugarcanes (in the rest of world). PLA films are available commercially from, for example, Nature Works LLC (Minnetonka, Minn.). In another exemplary embodiment, a reconstituted cellulose film may be used as the humidity-dependent permeable film.

Referring still to FIGS. 1 and 2, method 10 continues by coating at least one surface of the humidity-dependent permeable film 60 with a coating material 65 that permits the otherwise non-heat sealable humidity-dependent permeable film to be heat sealed (step 30). The coating material will form an outer coating on the humidity-dependent permeable film. "Outer coating" as used herein means that the coating material forms an outer layer without overlying layers. In an embodiment, the coating material comprises a heat sealing polymer, and an anti-blocking agent. The heat sealing polymer is available commercially as an emulsion in water with about 15 to about 50 wt % solids. In an embodiment, the heat sealing polymer comprises a stretchable urethane polymer, a stretchable acrylic polymer, or a combination of stretchable urethane polymer and stretchable acrylic polymer. Suitable stretchable urethane and stretchable acrylic polymers are those capable of being stretched (as part of the coating material), the stretch factor as hereinafter described, at an elevated temperature of about 190° C. to about 220° C. The stretchable urethane and acrylic polymers used in accordance with exemplary embodiments described herein retain their heat sealing character after stretching. As used herein, the term "heat sealing character" means that the polymer may be heat sealed at a temperature of about 175° C. to about 205° C. and a pressure of about 0.28 MPa to about 0.41 MPa (40 to 60 psi). The initial selection criterion is that the stretchable urethane and acrylic polymer have greater than about 100% ultimate elongation at ambient temperature (23° C.) as typically determined by the polymer supplier, preferably greater than about 400% elongation at ambient temperature (23° C.). Non-limiting examples of stretchable urethane polymers include Chemtura® Witcobond® W-507, Witcobond® W-290H, and Witcobond® W-170 (available from Chemtura Corporation, Middlebury, Conn.) or Hauthaway HD 4664 and Hauthaway HD 2024 (available from Hauthaway Corporation, Lynn, Mass.). Non-limiting examples of stretchable acrylic polymers include acrylic-urethane systems such as, for example, Chemtura® Witcobond® A-100 (available from Chemtura Corporation) or ADM Tronic Aqualene® 1400 HW (available from ADM Tronics Unlimited, Inc., Northvale, N.J.).

In another embodiment, the heat sealing polymer comprises a poly-vinylidene chloride (PVdC) polymer and the coating material further comprises a nanoclay, for purposes as hereinafter described. The PVdC polymer has a high water barrier (i.e., a low MVTR) and a high oxygen barrier. The PVdC polymer also has excellent heat sealing characteristics and therefore can be used as a heat sealant material. The PVdC polymer is available commercially as either "Barrier PVdC" or "Adhesive grade PVdC" from, for example, Rohm and Haas Company, Rohm and Haas Chemicals LLC (a wholly-owned subsidiary of DOW Chemical), Spring House, Pa. While both types are suitable, these commercially available PVdC polymers have some different properties, including their heat sealing speed. The Barrier PVdC does not heat seal very quickly and therefore heat and pressure are applied for greater than two seconds at temperatures above about 204° C. The adhesive grade PVdC heat seals in a shorter period of time (about 0.5 to about 2 seconds) with lower temperatures (about 191° C. (375° F.) or lower) and pressures (about 0.28 MPa to about 0.41 MPa (40 to 60 psi)). The selection of which one to use will generally depend on the heat sealing requirements of the packager. Commercially available examples of adhesive grade PVdC emulsions include Serfene™ emulsions from Rohm and Haas Company of Philadelphia, Pa., particularly Serfene™ 2022 and 2026 primerless.

As noted previously, the PVdC polymer is heat sealable with a high water and oxygen barrier. The high water barrier (i.e., low MVTR) of PVdC polymer is constant over all relative humidities and as such, is undesirable for packaging moisture sensitive foods. The addition of the nanoclay to the PVdC polymer substantially eliminates the conventional water barrier characteristics of the PVdC polymer. As the water barrier characteristics of the PVdC have been substantially eliminated by addition of the nanoclay, the MVTR of the humidity-dependent permeable film 60 controls the transmission rate of the water vapor through the packaging material. Nanoclays are layered silicates and are naturally hydrophilic. Nanoclays suitable for use herein are untreated or unmodified, where an "untreated nanoclay" or "unmodified nanoclay" has the same meaning and is defined herein as a nanoclay that has not been reacted with, has not exchanged ions with, or has not formed a complex with any surfactant, organoammonium salt, or any other intercalant compound that migrates in between layers of the nanoclay forming a complex having altered properties. This particularly means that the nanoclay is not complexed with any compound or material that affects the natural hydrophilicity of the clay. Such clays are specifically exclusive of organoclays, which are nanoclays that have been organically modified or treated with organocations (typically quaternary alkylammonium ions) to exchange the original interlayer cations for organocations to provide the clay with an organophilic, hydrophobic surface. Exemplary nanoclays for use herein include unmodified natural or unmodified synthetic phyllosilicates such as, for example, montmorillonite, volkonskoite, hectorite, pyrophyllite, saponite, sauconite, magadilite, kenyaite, vermiculite, beidillite, saponite, nontronite, fluoromica, or a combination thereof. Unmodified mica and talc clays are also suitable. In some examples, the nanoclay can have an average platelet thickness in the range of from about 1 nm to about 100 nm and an average length and average width each in the range of from about 50 nm to about 500 nm. The clay preferably has an aspect ratio of from about 50 to about 1000, more preferably from about 100 to about 300, most preferably about 300.

To form the coating material, the PVdC polymer can be, for example, melt compounded or blended with the nanoclay to form a polymer nanocomposite. A nanocomposite can alternately be formed by first providing a mixture of at least one monomer and at least one nanoclay followed by initiating an in-situ polymerization reaction in the mixture to cause the at least one monomer to polymerize. Nanocomposites and methods for their formation are well known in the art. As used herein, a "nanocomposite" is a polymer structure that comprises a polymer matrix (e.g. PVdC) having a nanometer-scale additive (i.e. nanoclay particles/platelets) distributed evenly therein. The polymer-nanoclay blend or nanocomposite can then be coated onto the humidity-dependent permeable film 60 using conventional techniques such as, for example, gravure, reverse gravure, etc. The coating material comprises a nanoclay content of about 0.2% to about 5% by weight of the PVdC polymer. In such example, the PVdC polymer can comprise about 95% by weight to about 99.8% by weight of the coating material.

As noted previously, the coating material may comprise an anti-blocking agent. The term "anti-blocking agent" is used herein to describe substances that reduce the tendency of films or sheets to stick or adhere to each other or to other surfaces when such adhesion is otherwise undesirable. Exemplary anti-blocking agents include conventional anti-blocking agents such as non-platelet morphology inorganic particles (ceramic glass spheres, fly ash, diatomaceous earth, synthetic silica, clay, or the like), organic particles (microparticles such as silicone resins or other polymeric beads), mold release agents such as flurocompounds and silicone, slip agents such as fatty acids (e.g., stearic acid), and natural and synthetic waxes (e.g., carnauba wax). The anti-blocking agent is added to the emulsion of the heat sealing polymer in an amount of about 0.25% by weight to about 5.0% by weight of the solids content of the emulsion (i.e., about 15 to about 50 wt % solids as noted previously). For example, carnauba wax, available as a liquid wax dissolved in alcohol, may be added in an amount of about 0.5% to about 5.0% by weight of the solids content of the emulsion. The liquid wax is added to the emulsion of the heat sealing polymer to produce the coating material. The nanoclay may be added to a PVdC emulsion prior to, simultaneously, or after addition of the liquid wax.

The coating material may further comprise an anti-fog composition. The anti-fog composition prevents condensation on the heat sealable food packaging film when used to package moisture sensitive products. Non-limiting examples of anti-fog compositions include glycerol monoesters of a saturated or unsaturated fatty acid having from about 8 to about 20 carbon atoms, glycerol diesters of a saturated or unsaturated fatty acid having from about 8 to about 20 carbon atoms and ionic surfactants having phosphate, sulfate or quaternary amine functional end groups. Also suitable as anti-fog compositions are surfactants including anionic, cationic, nonionic and amphoteric surfactants. Suitable ionic surfactants have phosphate, sulfate or quaternary amine functional end groups. Other anti-fog compositions include sorbitan esters of aliphatic carboxylic acids, glycerol esters of aliphatic carboxylic acids, esters of other polyhydric alcohols with aliphatic carboxylic acids, polyoxyethylene compounds, such as the polyoxyethylene sorbitan esters of aliphatic carboxylic acids and polyoxyethylene ethers of higher aliphatic alcohols. Preferred anti-fog compositions are glycerol monooleate, glycerol monostearate, sorbitan esters and blends thereof. The anti-fog composition may be added to the heat sealing polymer emulsion before coating of the film, in an amount of from about 0.5 weight percent to about 2.0 weight percent of the solids content of the emulsion.

The humidity-dependent permeable film 60 may be coated with the coating material in any manner known to one skilled in the art to form a coated film. Conventional coating methods include, for example, gravure, reverse gravure, spray coating, or the like. Referring again to FIG. 1, the coated film may optionally be dried in a heat setting step (step 40) or still include water from the emulsion when subjected to stretching, as hereinafter described. The heat setting step may be performed at temperatures between about 65° C. to about 120° C. for about 2 seconds to about 30 seconds to substantially dry the coated film.

The coated film, substantially dried or wet, is then biaxially oriented, i.e., stretched in two perpendicular directions in a "biaxial sheet stretching process" (step 50). The coated film is stretched at an elevated temperature of about 190° C. to about 220° C. enhancing adhesion of the coating material to the film, thereby avoiding the need for an intermediate adhesive primer layer. The coated film is oriented to a draw ratio of from about ×2.6 to about ×3.0 in each of its machine (longitudinal) direction and transverse direction. As used herein, the term draw ratio is an indication of the increase in the dimension in the direction of draw. The coated film may be simultaneously biaxially oriented, wherein the coating material is applied in-line onto the film before biaxially orienting the humidity-dependent permeable film and coating material together. For example, in an in-line coating process, the combined humidity-dependent permeable film and coating material are biaxially oriented together in both the machine and transverse directions at the same time or sequentially wherein the coated film is stretched in the machine direction first and then in the transverse direction. Typically, coat weights of about 1.68 grams/m$^2$ (1 lbs/ream) to about 16.8 grams/m$^2$ (10 lbs/ream) are achieved by reverse gravure (or the like) coating on the film prior to stretching. Stretching decreases the final coat weight by the stretch factor, which may be from about 7.5 to about 10, preferably about 9 to about 10 for the biaxially oriented coated film. This means that a starting coat weight of 16.8 g/m$^2$ (10 lbs/ream) will be reduced by a factor of 9 or 10. Thus, the amount of coating material required is significantly reduced from that which would be otherwise used if the biaxial sheet stretching process was performed prior to coating the film, rather than after the film has already been coated. As coating materials are very costly, the reduction in coat weight significantly reduces material costs. The biaxially oriented coated film may be formed into and stored as a roll. The anti-blocking agent substantially prevents the adhesion of the layers in the roll.

Figure 3:
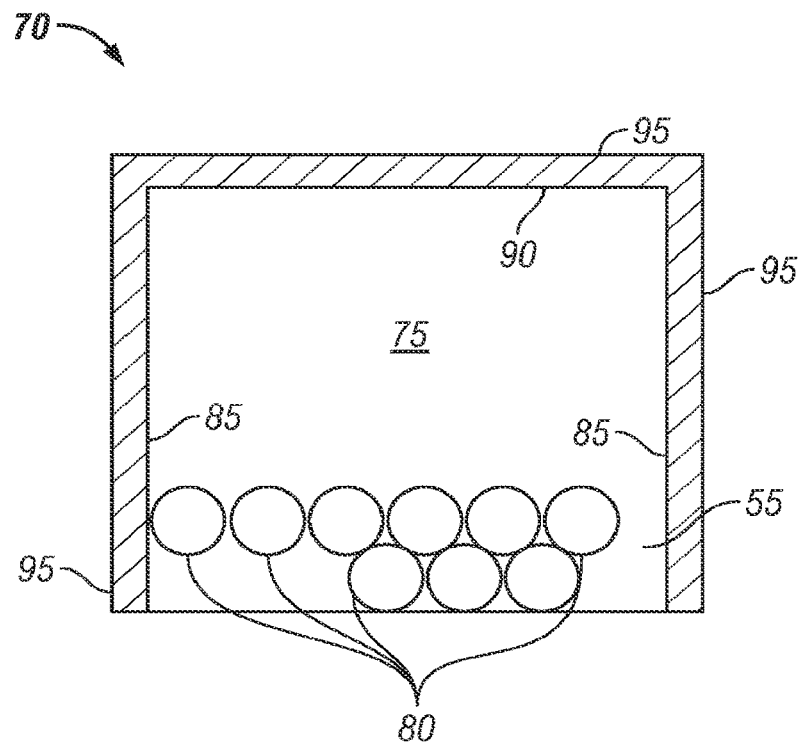
FIGS. 3 and 4 are cross-sectional views of exemplary food packages using the heat sealable food packaging film according to exemplary embodiments of the present invention.

Referring now to FIG. 3, the heat sealable food packaging film may be used as all or part of a food package. The heat sealable food packaging films are food contact acceptable per 21 CFR 175.105 and 21 CFR 175.300. The heat sealable food packaging film heat seals to itself (coated side to coated side) as well as to certain heat sealable polymers such as Amorphous Polyethylene Terephthalate (APET) and Glycolyzed Polyethylene Terephthalate (GPET) to form the food packages. An exemplary food package 70 formed from a heat sealable food packaging film 55 comprising a pouch 75 containing a food product 80 is illustrated in FIG. 3. The food package comprises the heat sealable food packaging film folded upon itself, thus having side and end portions 85 and 90, heat sealed to form one or more heat seals 95. Alternatively, although not shown, pouch 75 may be formed of heat sealable food packaging film 55 heat sealed on one or more sides to another heat sealable film. It is to be understood that the term "another heat sealable film" as used herein can include a heat sealable food packaging film having the same or a different composition as contemplated herein or an entirely different heat sealable film.

Figure 4:
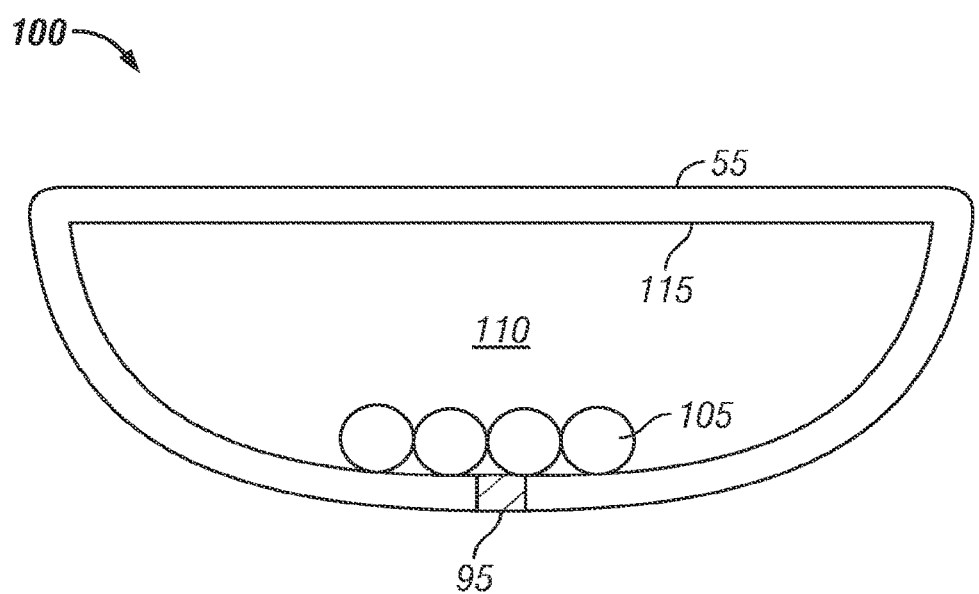

Another exemplary food package 100 containing an exemplary food product 105 is illustrated in FIG. 4 comprising the heat sealable food packaging film 55 and a container 110 having an open portion 115 with the heat sealable food packaging film 55 surrounding the container and heat sealed such that the heat sealable food packaging film is positioned around the open portion of the container, for example, by the application of heat, to heat side and/or end portions together to form the heat seal 95 sealing the open portion of the container. The container may be, for example, a tray or the like. Other types of food packages may be formed from the heat sealable food packaging film contemplated herein as known to one skilled in the art.

From the foregoing, it is to be appreciated that the heat sealable food packaging films in accordance with exemplary embodiments permit the egress of water vapor from the food package, thereby substantially preventing condensation inside the food package, extending food product storage and shelf life, preserving safety and quality such as fresh flavor and nutritional value, and reducing supply chain waste. The heat sealable food packaging films produced in accordance with exemplary embodiments are especially useful under high humidity and refrigerated conditions. The methods for producing the heat sealable food packaging films according to exemplary embodiments are less costly than conventional off-line production methods and eliminate the need for a primer.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the inventive subject matter in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims and their legal equivalents.

What is claimed is:

1. A heat sealable food packaging film comprising:
   a humidity-dependent permeable polyamide film having first and second sides;
   an outer coating on a surface of a first side of the film, the outer coating forming an outer layer without overlying layers and comprising a nanoclay dispersed in a poly-vinylidene chloride (PVdC) polymer; and
   the heat sealable food packaging film having a moisture vapor transmission rate (MVTR) greater than 50 g/m$^2$/day at 90% relative humidity at 23° C. according to ASTM E96.

2. The heat sealable food packaging film of claim 1, wherein the humidity-dependent permeable polyamide film is an innermost layer without underlying layers.

3. The heat sealable food packaging film of claim 2, wherein the heat sealable food packaging film consists of the humidity-dependent permeable polyamide film and the outer coating.

4. The heat sealable food packaging film of claim 1, wherein the nanoclay has an aspect ratio of from about 50 to about 1000.

5. The heat sealable food packaging film of claim 1, wherein the nanoclay has an aspect ratio of from about 100 to about 300.

6. The heat sealable food packaging film of claim 1, wherein the nanoclay content of the outer coating is in an amount of from about 0.2 wt. % to about 5 wt. % based on the weight of the PVdC polymer.

7. The heat sealable food packaging film of claim 1, wherein the polyamide of the humidity-dependent permeable polyamide film has a molecular weight of from 10,000 to about 100,000 Daltons.

8. The heat sealable food packaging film of claim 1, wherein the outer coating further comprises an anti-blocking agent in the form of a wax.

9. The heat sealable food packaging film of claim 1, wherein the humidity-dependent permeable polyamide film is biaxially oriented.

10. The heat sealable food packaging film of claim 1, wherein the film is formed into a pouch containing a moisture sensitive food product.

11. A food package comprising:
    a heat sealable food packaging film comprising:
       a humidity-dependent permeable polyamide film having first and second sides;
       an outer coating on a surface of a first side of the film, the outer coating forming an outer layer without overlying layers and comprising a nanoclay dispersed in a poly-vinylidene chloride (PVdC) polymer; and
       the heat sealable food packaging film having a moisture vapor transmission rate (MVTR) greater than 50 g/m$^2$/day at 90% relative humidity at 23° C. according to ASTM E96, wherein the heat sealable food packaging film is heat sealed to form the food package, the food package further containing therein a moisture sensitive food.

12. The food package of claim 11, wherein the humidity-dependent permeable polyamide film is an innermost layer without underlying layers.

13. The food package of claim 12, wherein the heat sealable food packaging film consists of the humidity-dependent permeable polyamide film and the outer coating.

14. The food package of claim 11, wherein the nanoclay has an aspect ratio of from about 50 to about 1000.

15. The food package of claim 11, wherein the nanoclay has an aspect ratio of from about 100 to about 300.

16. The food package of claim 11, wherein the nanoclay content of the outer coating is in an amount of from about 0.2 wt. % to about 5 wt. % based on the weight of the PVdC polymer.

17. The food package of claim 11, wherein the polyamide has a molecular weight of from about 10,000 to about 100,000 Daltons.

18. The food package of claim 11, wherein the outer coating further comprises an anti-blocking agent in the form of a wax.

19. The food package of claim 11, wherein the humidity-dependent permeable polyamide film is biaxially oriented.

20. The food package of claim 11, further comprising a container having an open portion and the heat sealable food packaging film sealing the open portion.

\* \* \* \* \*